(12) United States Patent
Mühlbach

(10) Patent No.: US 6,669,227 B2
(45) Date of Patent: Dec. 30, 2003

(54) FASTENER FOR FASTENING A CURTAIN AIRBAG TO A VEHICLE

(75) Inventor: Steffen Mühlbach, Egelsbach (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 107 days.

(21) Appl. No.: 10/107,330

(22) Filed: Mar. 28, 2002

(65) Prior Publication Data

US 2003/0020269 A1 Jan. 30, 2003

(30) Foreign Application Priority Data

Jul. 26, 2001 (DE) ..................................... 201 12 342 U

(51) Int. Cl.[7] .............................................. B60R 21/16
(52) U.S. Cl. ................. 280/728.2; 280/730.2; 280/743.2; 403/220
(58) Field of Search ................... 280/728.2, 730.2, 280/743.2; 403/203, 220, 223; 24/265 R

(56) References Cited

U.S. PATENT DOCUMENTS

| | | | | |
|---|---|---|---|---|
| 3,721,750 A | * | 3/1973 | Countryman | ............... 174/135 |
| 4,036,546 A | * | 7/1977 | Thompson et al. | .......... 439/435 |
| 4,986,569 A | * | 1/1991 | Bruton | ..................... 280/728.2 |
| 5,398,960 A | * | 3/1995 | Ravenberg et al. | ....... 280/728.3 |
| 5,588,672 A | | 12/1996 | Karlow et al. | ............ 280/730.2 |
| 6,053,527 A | * | 4/2000 | Gans et al. | ............... 280/728.3 |
| 6,378,897 B1 | * | 4/2002 | Butters et al. | ........... 280/730.2 |
| 2002/0035766 A1 | * | 3/2002 | Szabo | ........................ 24/129 R |
| 2003/0184058 A1 | * | 10/2003 | Gray et al. | ............... 280/728.3 |

FOREIGN PATENT DOCUMENTS

| | | |
|---|---|---|
| DE | 19860574 | 7/2000 |
| DE | 20014568 U1 | 2/2001 |
| DE | 20101118 U1 | 8/2001 |
| EP | 0978421 A1 | 8/1999 |
| WO | WO 02/28691 A1 | 4/2002 |

* cited by examiner

*Primary Examiner*—Eric Culbreth
*Assistant Examiner*—Laura B. Rosenberg
(74) *Attorney, Agent, or Firm*—Lonnie Drayer; Jarett Rieger

(57) ABSTRACT

A fastener for securing a tether of a curtain airbag to a vehicle. The fastener includes a border projecting essentiallly from the side of the fastener for locking the fastener to the vehicle. The fastener also has a vertically extending recess in one of the side walls for receiving the tether of the curtain airbag.

14 Claims, 3 Drawing Sheets

FASTENER FOR FASTENING A CURTAIN AIRBAG TO A VEHICLE

FIELD OF THE INVENTION

The present invention relates to a fastener for attaching a curtain airbag to a vehicle.

BACKGROUND OF THE INVENTION

So-called curtain airbags are known which are arranged in the roof lining of a vehicle and extend in a crash are deployed along the sides of the vehicle, so that the occupants of the vehicle are protected from injuries which can arise from the impact of a body part, in particular the head, against the side structure of the vehicle. The lower corners of this type of curtain airbag, in particular the corner arranged at the front in the vehicle, are connected to a fastener via a cord or string, whereby the airbag, the string and the fastener form a unit. The fastener locks into a recess of the vehicle. By a suitable mechanism, it can be ensured that the curtain airbag is sufficiently tensioned and for instance an arm or head of a vehicle occupant can be prevented from being caught between the airbag and the side structure of the vehicle.

The fasteners can, however, be damaged before or during the installation of the curtain airbag, which leads to the entire airbag being no longer usable and having to be discarded.

SUMMARY OF THE INVENTION

There is provided In accordance with the invention a fastener for fastening a curtain airbag to a vehicle comprising: a pair of opposed lateral walls and a top side and a bottom side, means for locking the fastener to a vehicle, in particular in a recess in a vehicle part in a detachable manner; and a means for clamping in which a tether can be arranged in a detachable manner and in a secure position with relation to the fastener Since the fastener can be secured in a detachable manner to a tether of a curtain airbag the fastener can be attached to the curtain airbag just before or during the installation in the vehicle. The risk of damaging the fastener during preparatory work before the installation of the curtain airbag is reduced. If the fastener is damaged at this stage a faulty fastener can easily be replaced. The position of the fastener in relation to the curtain airbag can be varied according to vehicle type.

DETAILED DESCRIPTION OF THE INVENTION

Figure 1:
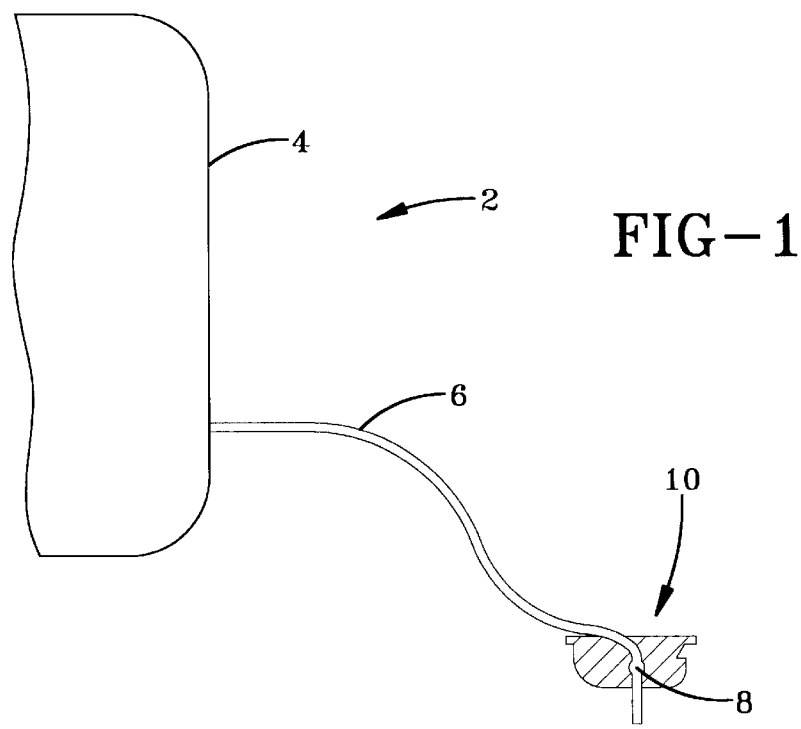
FIG. 1 is a fragmentary view of a curtain airbag in accordance with a preferred embodiment of the invention.

FIG. 1 is a fragmentary top view of a curtain airbag 2 according to a preferred embodiment of the invention. The curtain airbag comprises a gas bag 4, a tether 6 and a fastener 10 clamped in a detachable manner to the tether 6. The tether is preferably oblong and/or manufactured from the same material as the gas bag. Alternatively, the tether can comprise a cord that is securely connected to the gas bag, preferably by sewing or any other suitable fastening method. In a preferred embodiment, the tether 6 of the curtain airbag 4 has a thickened section 8 in the region of its free end. The curtain airbag 2 is preferably arranged in the roof lining of a vehicle along a side of the vehicle. The fastener 10 locks into a suitable place in the vehicle. In a crash the curtain airbag 2 is released and emerges from the roof lining of the vehicle. By means of a suitable tensioning device (not represented) the curtain airbag 2 can be securely held along the side of the vehicle, whereby the tensioning device exerts a force, preferably a pulling force, onto the unfolding gas bag 4 over the tether 6, which is clamped in the fastener. A fastener 10 according to the invention is described below with reference to FIGS. 2 to 4.

Figure 2:
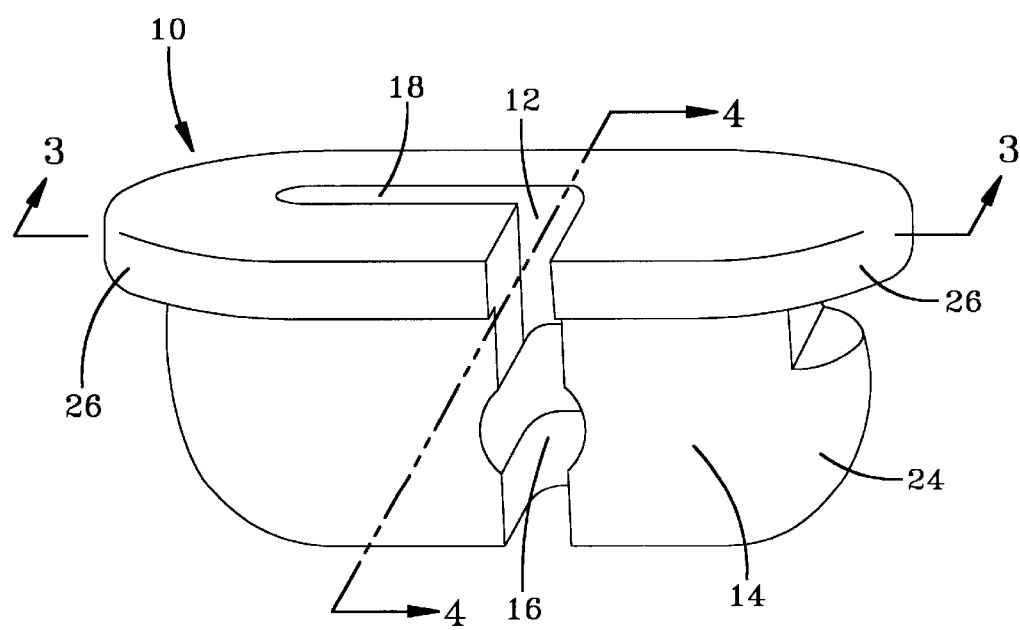
FIG. 2 is perspective view of a fastener in accordance with a preferred embodiment of the present invention.
Figure 3:
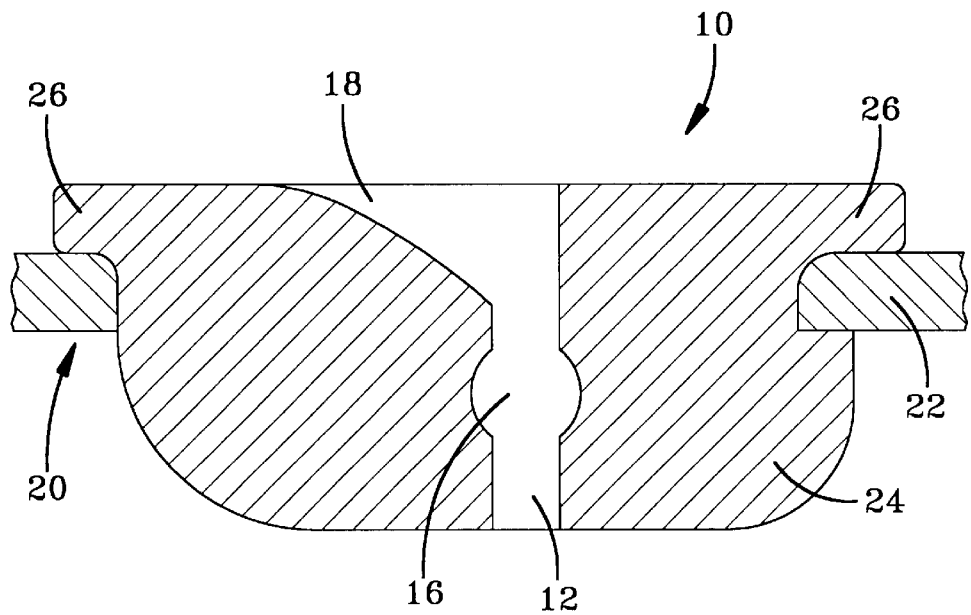
FIG. 3 is a sectional view of the fastener of FIG. 2 along line 3—3.
Figure 4:
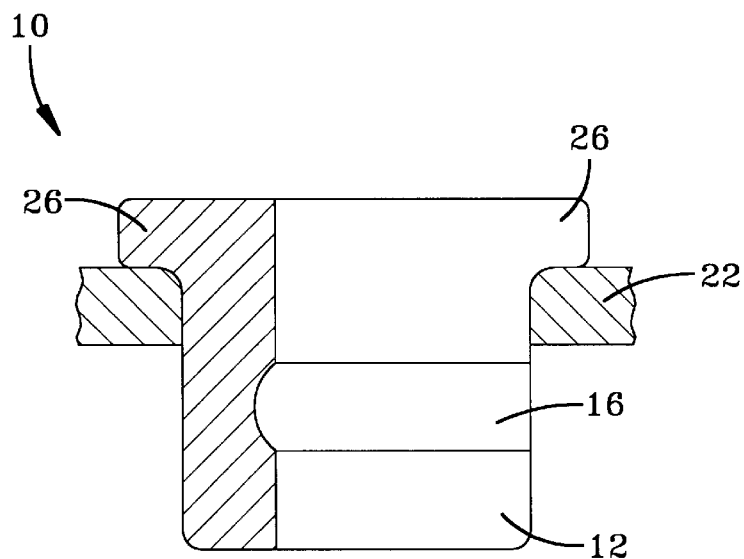
FIG. 4 is a sectional view of the fastener of FIG. 2 along line 4—4.

FIG. 2 is perspective view of a fastener in accordance with a preferred embodiment of the present invention. FIG. 3 is a sectional view of the fastener of FIG. 2 along line 3—3. FIG. 4 is a sectional view of the fastener of FIG. 2 along line 4—4. A fastener 10 according to the invention has a vertically extending recess 12 in a side wall 14, preferably in one of the two longitudinal side walls, whereby the vertically extending recess 12 extends essentially over the entire height of the fastener 10. The vertically extending recess 12 is preferably a groove or slot in the side wall 14 of the fastener 10. It is also conceivable, however, for the vertically extending recess 12 to have another suitable shape. It is furthermore conceivable that the vertically extending recess 12 extends over merely part of the height of the side wall 14. The vertically extending recess 12 is a means for clamping or arranging or fixing or fastening the fastener 10 in a detachable manner on the tether 6 of a curtain airbag 2, i.e. for instance in the shape of a cord fastened to the curtain airbag.

The vertically extending recess 12 is a means for clamping and has an essentially constant width and an essentially cylindrical widened portion 16 at an intermediate section, in which a thickened section of a tether can be arranged. The thickened section of the tether is preferably essentially spherical in shape. Due to the provision of a spherical shape for the thickened section, it can be ensured that the tether is held in the preferably cylindrical recess in the fastener in an even more secure manner. The cylindrical widened portion 16 is preferably essentially hemispherical at the end that is arranged on the inside of the fastener. This way the secure support of the tether in the fastener can be increased even further. The widened portion 16 has an essentially cylindrical shape and is essentially hemispherical at the end positioned in the middle of the fastener 10, as can be seen from FIG. 4. The widened portion 16 of the vertically extending recess essentially has the shape of a borehole that is perpendicular to the side wall 14 and does not penetrate through the fastener 10, whereby the end of the borehole which lies inside the fastener 10 and is preferably essentially hemispherical in shape and clamps the thickened section 8 of the tether 6 in an advantageous and secure manner in the fastener 10.

In addition, the vertically extending recess 12 in the fastener 10 is preferably widened into a laterally extending slot 18 at the top side of the fastener 10. This laterally extending slot 18 extends perpendicular to the axis of the vertically extending recess 12. The laterally extending slot 18 is provided to guide or direct the tether of a curtain airbag clamped in the fastener 10 in the vertically extending recess 12 and the widened portion 16, in a desired direction. In addition, the laterally extending slot 18 prevents an easy sliding out or detachment of the tether from the fastener 10. Due to the provision of a laterally extending slot in the top surface of the fastener, it can be ensured that the tether arranged in the fastener is securely held and can be guided in a preferred direction with relation to the fastener.

As shown in FIGS. 3 and 4, during use, the fastener 10, which is clamped to a tether of a curtain airbag, preferably locks into a recess 20 in a vehicle part 22. To ensure a secure locking of the fastener 10 in the recess 20 in the vehicle part 22 in accordance with the present invention, the fastener 10 has a projection or a catch 24, which extends away from the bottom side of the fastener 10, preferably essentially to one side. To ensure as secure a support as possible of the fastener 10 in the recess 20 of the vehicle part 22, the projection 24 is preferably on the side, which is opposite the side or direction in which the laterally extending slot 18 extends. Other suitable possibilities for locking the fastener 10 in the recess 20 of the vehicle part 22 are, however, also conceivable, as long as the fastener 10 is securely held in the recess 22.

In addition, the fastener 10 according to the invention has a border or ledge 26 projecting essentially peripherally from the side of the fastener 10, and which prevents the fastener 10 according to the invention from falling through the recess 20 of the vehicle part 22. It is not necessary, however, that the border 26 be completely peripheral, it would also be conceivable for it to be provided on only two opposite sides of the fastener 10.

The fastener 10 according to the invention is, as described above, is preferably fastened to the tether 6 of the curtain airbag 4. The tether 6 of the curtain airbag 4 in a preferred embodiment has a thickened section 8 at a suitable position (see FIG. 1), in order to be securely held in the fastener 10, in particular in the widened portion 16 of the vertically extending recess 12.

The fastener is preferably made of a material that has a high rigidity. In this way it is ensured that the fastener on the one hand can securely hold the curtain airbag tether even under a high load and on the other hand be securely held in the recess in the vehicle part.

Figure 5:
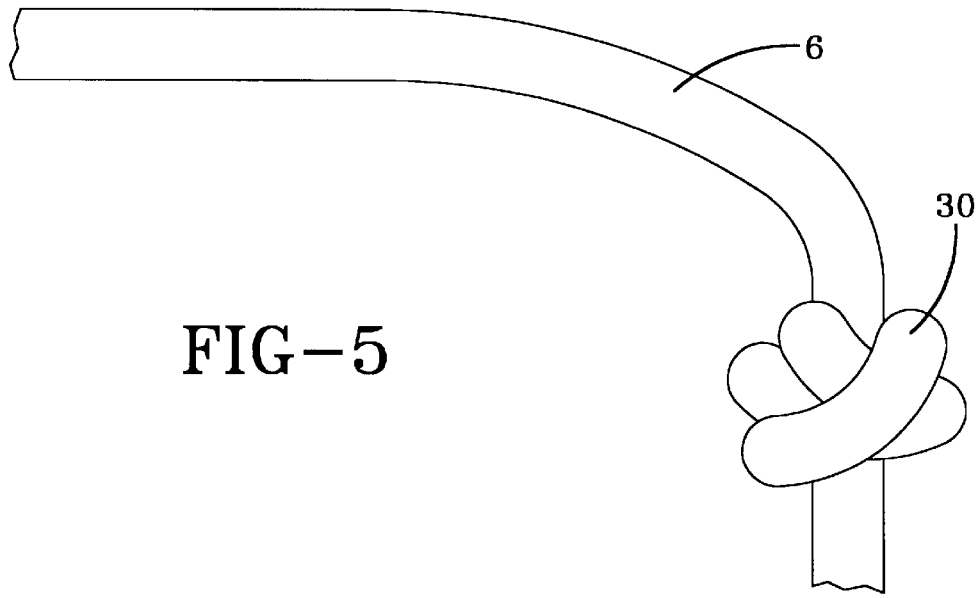
FIG. 5 is a fragmentary view of a section of a curtain airbag in accordance with an embodiment of the invention.
Figure 6:
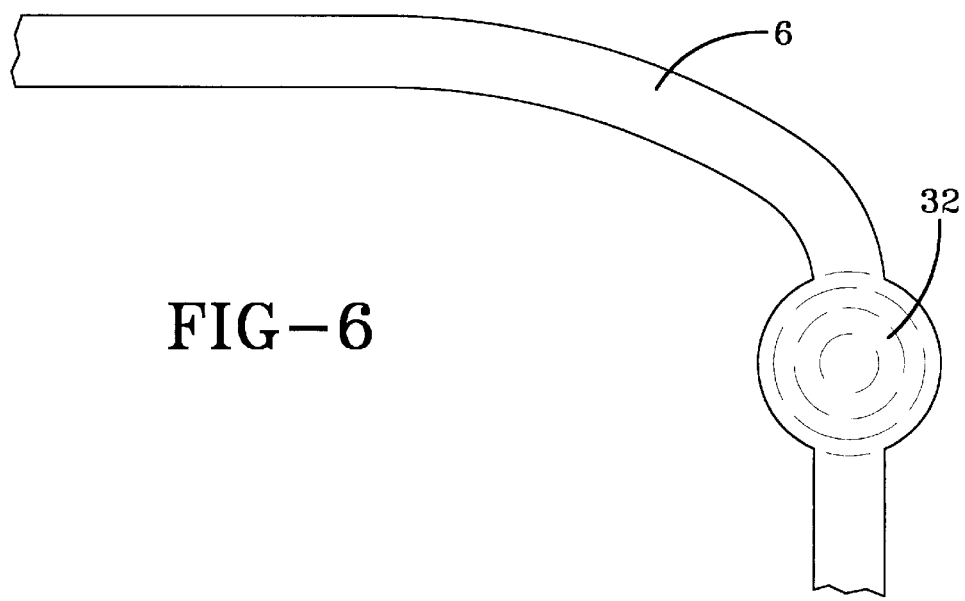
FIG. 6 is a fragmentary view of a section of a curtain airbag in accordance with another embodiment of the invention

FIGS. 5 and 6 show preferred embodiments of the tether that is fastened to the gas bag 4 of the curtain airbag 4 according to the invention. In a preferred embodiment, the thickened section 8 is a knot 30 in the tether 6. The knot 30 can be provided in a simple manner in the tether 6. In addition, the location of the thickened section 8 in the tether 6 can thus be suitably varied, if the curtain airbag 2 according to the invention is to be used in different vehicle models. In addition, the thickened section 8 can also be a thickened section 32 in the material of the tether 6. It is conceivable, however, to use any other suitable method, in order to provide a thickened section 8 in the tether 6. For instance, it would be furthermore conceivable additionally to incorporate globules or other suitable shapes from a suitable material in the tether 6.

The tether 6 can be manufactured from the same material as the gas bag 4 itself. In addition, the tether 6 can be sewn to the gas bag 4 of the curtain airbag 2. Any other suitable connection form, however, such as for instance gluing, is also possible between the tether 6 and the gas bag 4.

Many changes and modifications in the above described embodiments of the invention can, of course, be carried out without departing from the scope thereof. Accordingly, that scope is intended to be limited only by the appended claims.

I claim:

1. A fastener for fastening a curtain airbag to a vehicle comprising:
    a pair of opposed laterally extending side walls and a top side and a bottom side,
    means for locking the fastener to a vehicle, in particular in a recess in a vehicle part in a detachable manner; and
    a means for clamping in which a tether can be arranged in a detachable manner and in a secure position with relation to the fastener, wherein the means for clamping is a vertically extending recess in one of the side walls of the fastener in which the tether can be arranged.

2. The fastener for fastening a curtain airbag to a vehicle according to claim 1, wherein the vertically extending recess extends the entire height of the fastener.

3. The fastener for fastening a curtain airbag to a vehicle according to claim 2, wherein the vertically extending recess forming the means for clamping has an essentially constant width and an essentially cylindrical widened portion at an intermediate section thereof, in which a thickened section formed in the tether can be arranged.

4. The fastener for fastening a curtain airbag to a vehicle according to claim 3, wherein the vertically extending recess forming the means for clamping is widened on the top side of the fastener to form a laterally extending slot.

5. The fastener for fastening a curtain airbag to a vehicle according to claim 4, wherein the means for locking is a projection formed on the fastener, which projects from at least one side surface of the fastener and is arranged near the bottom side of the fastener.

6. The fastener for fastening a curtain airbag to a vehicle according to claim 5, wherein the means for locking further comprises a border that projects at least partly peripherally from one of the sides of the fastener and is arranged near the top side of the fastener.

7. The fastener for fastening a curtain airbag to a vehicle according to claim 3, wherein the means for locking is a projection formed on the fastener, which projects from at least one side surface of the fastener and is arranged near the bottom side of the fastener.

8. The fastener for fastening a curtain airbag to a vehicle according to claim 7, wherein the means for locking further comprises a border that projects at least partly peripherally from one of the sides of the fastener and is arranged near the top side of the fastener.

9. The fastener for fastening a curtain airbag to a vehicle according to claim 2, wherein the vertically extending recess forming the means for clamping is widened on the top side of the fastener to form a laterally extending slot.

10. The fastener for fastening a curtain airbag to a vehicle according to claim 1, wherein the vertically extending recess forming the means for clamping has an essentially constant width and an essentially cylindrical widened portion at an intermediate section thereof, in which a thickened section formed in the tether can be arranged.

11. The fastener for fastening a curtain airbag to a vehicle according to claim 10, wherein the vertically extending recess forming the means for clamping is widened on the top side of the fastener to form a laterally extending slot.

12. The fastener for fastening a curtain airbag to a vehicle according to claim 1, wherein the vertically extending recess forming the means for clamping is widened on the top side of the fastener to form a laterally extending slot.

13. The fastener for fastening a curtain airbag to a vehicle according to claim 1, wherein the means for locking is a projection formed on the fastener, which projects from at least one side surface of the fastener and is arranged near the bottom side of the fastener.

14. The fastener for fastening a curtain airbag to a vehicle according to claim 13, wherein the means for locking further comprises a border that projects at least partly peripherally from one of the sides of the fastener and is arranged near the top side of the fastener.

* * * * *